Nov. 14, 1950        A. L. PAYTON        2,530,174
APPARATUS FOR MIXING LIQUIDS
Filed June 23, 1948
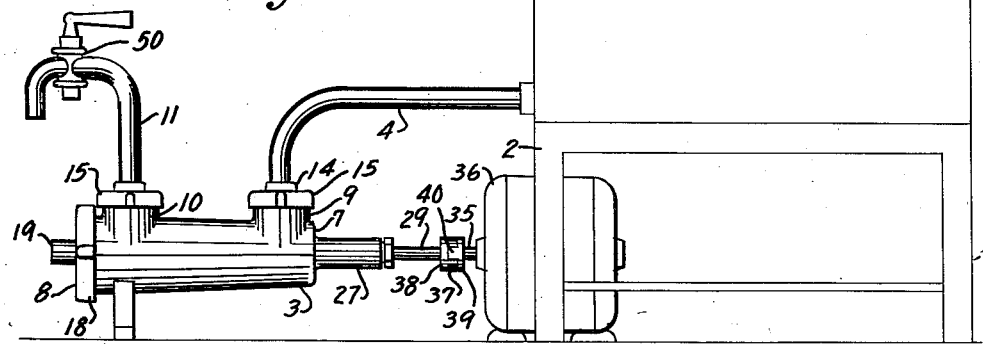
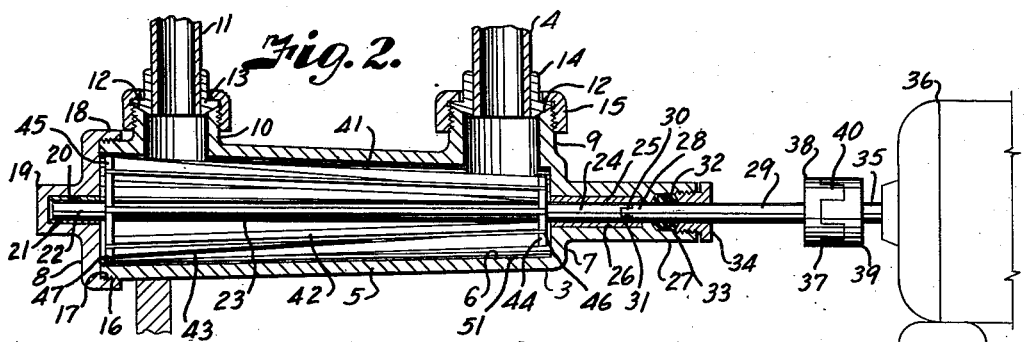
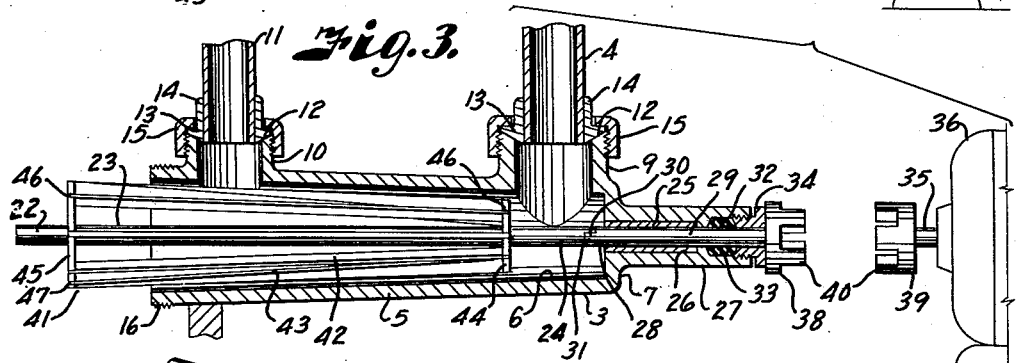
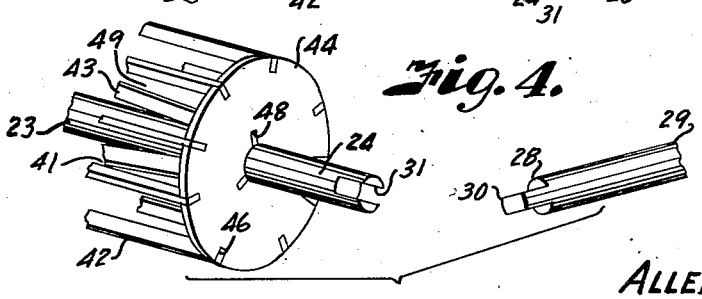
Inventor
ALLEN L. PAYTON
By Fishburn & Mullendore
Attorneys Patented Nov. 14, 1950

2,530,174

UNITED STATES PATENT OFFICE 2,530,174

APPARATUS FOR MIXING LIQUIDS

Allen L. Payton, Kansas City, Mo., assignor to Tranin Egg Products Company, Kansas City, Mo., a corporation of Missouri Application June 23, 1948, Serial No. 34,757

1 Claim. (Cl. 259—10)

This invention relates to apparatus for mixing liquids and more particularly to a mixer structure adapted for quick removal of the agitator assembly for cleaning the apparatus.

Yolks and whites of eggs separated from the shells, and yolks and whites together, are prepared for packaging by churning to produce a homogeneous liquid having uniform color and texture. In order to avoid foam, which tends to remain with a liquid egg product and reduce the quality and value of same, the liquid egg product is passed through a mixer having a rotating agitator assembly which cuts the white of the egg and mixes the yolk and white while moving same in a continuous stream through the mixer. This preliminary mixing or beating of the liquid egg product is performed while said product is isolated from air to eliminate any possibility of contamination of the liquid by bacteria floating in the air and also to prevent formation of foam. In such apparatus it is essential that all parts of the apparatus contacting the liquid egg product be frequently sterilized and maintained free of any contamination, and disassembly for removal of the operating parts is necessary in order to accomplish the cleaning and sterilizing operation.

The objects of the present invention are therefore to provide a mixer structure permitting accessibility of all portions having contact with the liquid egg product; to provide a mixing apparatus adapted for easy and quick removal of the agitator assembly; to provide a driving arrangement for the agitator in which the mating portions are supported during the operation thereof yet freely separable for disassembling; to provide a slidable member for coupling the prime mover and agitator assembly, said slidable member being adapted for facilitating removal of the agitator from the apparatus; and to provide a mixer assembly of simple construction, economical to manufacture and easily maintained in a clean, sterilized condition.

In accomplishing these and other objects of the present invention I have provided improved details of structure, the preferred forms of which are illustrated in the accompanying drawings, wherein:

Fig. 1 is a side elevation of a mixing apparatus embodying my invention including the lower portion of a supply tank.

Fig. 2 is an enlarged longitudinal vertical section of the mixing casing and agitator connected with the drive therefor.

Fig. 3 is an enlarged longitudinal vertical section similar to Fig. 2 and illustrating the position of the drive member and agitator when the agitator is partially removed from the casing.

Fig. 4 is a detailed perspective view of the connecting portions of the agitator and drive member.

Referring more in detail to the drawing:

1 designates a supply tank supported in an elevated position by the table 2, and 3 designates a mixer casing located below the bottom of the tank and connected therewith by a conduit 4 for gravity flow of liquid from the tank to the casing. The casing comprises a wall 5 forming a horizontally elongated frusto-conical chamber 6 having the small end closed by a rear head 7 and the large end closed by a removable front head 8. The casing is provided with vertically extending tubular branches 9 and 10 communicating with the chamber adjacent the respective ends thereof and connected respectively with the conduit 4 and with an outlet conduit 11. The branches 9 and 10 are aligned on the top of the casing and having beveled seats 12 to receive the beveled peripheries of caps 13 having axial tubular bosses 14 in which the conduits are fixed. The caps are sealingly retained in the seats by rings 15 having skirt-like flange screws threadedly engaging the branches.

The large end of the casing has external threads 16 engaging internal threads 17 in a flange 18 of the front head 8 to removably secure said head on the casing and seal same. The head 8 has an axial external boss 19 provided with an internal socket 20 extending into the boss and provided with a bearing bushing 21 adapted to receive a trunnion like end portion 22 of an agitator shaft 23 for rotatably supporting one end of said shaft.

The agitator shaft extends through the chamber 6 and has its rear end 24 supported in a bearing bushing 25 located in a bore 26 of an axial external boss 27 carried by the rear head 7. The extension of the shaft 23 into the bearing bushing 25 is shorter than said bushing and is adapted for inter-engagement with the end 28 of an intermediate shaft 29, which extends into the bore of the boss 27 and is supported thereby. The inter-engagement of the shaft 23 and the shaft 29 must be such that rotation of the shaft 29 will drive the shaft 23, and relative longitudinal movement of the respective shafts will separate the engaging portions thereof. For example the end 28 of a shaft 29 is provided with a tongue 30 adapted for insertion into a slot 31 in the end 24 of the shaft 23. The sides of the tongue closely engages in the sides of the slot to provide a snug driving fit therefor. The outer end of the boss 26 is provided with a counterbore 32 for receiving suitable packing material 33 adapted to be compressed by a packing gland 34 suitably mounted in said counterbore whereby said packing may be compressed into engagement with the intermediate shaft 29 and the counterbore to seal same against leakage from the casing.

The rear end of the shaft 29 is separably coupled to the shaft 35 of a prime mover 36 by a coupling 37 having mating members 38 and 39 mounted on the intermediate shaft 29 and drive shaft 35, respectively. Said coupling members having inter-meshing members 40 so arranged that rotation of the shaft 35 will drive the shaft 29 and longitudinal movement of the shaft 29 will separate the inter-meshing members 40.

The shaft 23 rotatably mounted in the bearing bushings 21 and 25 support an agitating and propelling assembly 41 including agitating blades or paddles 42 extending in planes intersecting the planes of the axis of the shaft and propelling blades 43 extending angularly to the axis of the shaft. The blades are mounted in edgewise position on a plurality of radial members such as disks, preferably a pair of disks 44 and 45, fixed to the shaft in spaced relation and located adjacent the heads closing the ends of the chamber 6. The disk 44 at the inlet or small end of the chamber is smaller than the disk 45 adjacent to the outlet of said chamber and the paddles 42 have opposite ends mounted in peripheral radial notches 46 of the disks with the outer edges flush with the peripheries of the disks whereby a tapering or conical assembly is formed having increasing diameter from the inlet toward the outlet of the chamber. The paddles are relatively thin strips of suitable material, for example metal, having appreciable width substantially less than the radii of the disks and preferably having equal width through their length. A plurality of paddles are arranged symmetrically on the spaced disks, nine paddles being shown in the illustrated application of the invention.

The propelling blades 43 also comprise relatively thin and narrow strips and have outer ends mounted in peripheral notches 47 in the larger disk 45 similarly to the paddles. The inner ends of the propelling blades, however, are fixed in slots 43 extending radially from the axial opening in the inlet end disk 44 and engage the shaft thus forming a series of pockets 49 spaced inwardly from the inner edges of the paddles. The blades 43 are thus spirally related to the shaft and due to the radial character of the notches 47 and 48 the blades are curved slightly whereby their propelling action is enhanced. The blades 43 comprise a screw-like propeller and move liquid longitudinally in the assembly, moving liquid from an inlet branch to the outlet branch for flow to the outlet conduit 11 which leads to a valve coupling 50 for controlled delivery of mixed liquid to suitable containers for packaging.

In the structure illustrated, the outlet end portions of the paddles move close to the inner surface of the casing and the propeller tapers slightly more than the wall of the casing whereby the paddles at the small end of the propeller have greater spacing as at 51 from the wall of the case.

In using the apparatus the separated whites of eggs are introduced to the tank in sufficient amount to cover the outlet openings and drain into the air-tight pocket or casing. When the agitator casing is filled and further whites are supplied to the tank the agitator may be put into operation to cut the whites while the same move in a continuous stream from the tank to a container out of contact with air. The level of liquid in the tank is always kept above the tank outlet so the air will not be drawn into the casing while the liquid is flowing therethrough to the container.

The agitator in the casing is preferably rotated rapidly, the curved blades moving the egg liquid in a stream continuously and effecting mixing of the same while the straight paddles promote intermingling of the particles of the stream. Blades and paddles act as knives to cut the particles of whites while the same are contained in the air-tight pocket, and fill same to the exclusion of air, the cutting being effected without injury to the white or deleteriously affecting their condition.

After operation of the mixer it must be thoroughly cleaned and sterilized. Otherwise egg liquid standing therein or adhering to the walls would become contaminated and deleteriously affect eggs subsequently mixed therein. Hot water or other cleaning liquids may be flushed through the mixer, but flushing is incapable of removing particles of eggs adhering to surfaces in the mixer particularly to the blades of the agitator. Therefore it is necessary that the agitator be removed from the casing to thoroughly clean same. The coupling member 38 is grasped and moved toward the casing, the intermediate shaft 29 sliding in the bore 26 of the boss 25 and forcing the agitator assembly outwardly of the front or large end of the casing as shown in Fig. 3. The agitator may then be grasped and withdrawn from the chamber 6 and thoroughly cleaned in any suitable manner. The rings 15 may be removed from the inlet and outlet branches 9 and 10 for disconnecting the conduits 4 and 11 therefrom and providing access to the entire mixer for thorough cleaning of same. After the agitator and casing are cleaned, said agitator is inserted into the chamber 6 and the slot 31 engaged with a tongue 30, further movement of the agitator forcing the intermediate shaft 29 outwardly relative to the boss 25, or the shaft 29 may be moved relative to said boss and the end 24 of the shaft 23 inserted into the bore of the bearing bushing 25 and rotated relative to the shaft 29 until the tongue 30 engages into the slot 31. On further rearward movement of the agitator, the coupling member 38 may be engaged with the coupling member 39 while maintaining the inter-engagement between the shafts 23 and 29. The head 8 is aligned with the casing and the end 22 of the shaft 23 inserted into the bearing 21 and the head 8 screwed on the end of the casing to close same. The caps 13 are then placed in the seats 12 on the inlet and outlet branches and secured thereto by tightening the rings 15 thereon. The mixer is then ready for operation on a new batch of egg liquid.

It is believed obvious that this arrangement of the parts of the mixer facilitate the cleaning thereof thereby making certain that there will be no contamination of the egg liquid processed therein.

What I claim and desire to secure by Letters Patent is:

An agitator drive for liquid mixing apparatus having an agitator rotatable in a chamber defined by a casing, said agitator being removable through one end of the casing including, a relatively long axial boss extending outwardly from the other end of the casing and having an axial bore therein, a shaft mounting the agitator and having a trunnion slidably and rotatably mounted in the axial bore, a drive shaft rotatably and slidably mounted in the axial bore and having endwise separable driving engagement with the rotatable agitator shaft substantially midway the length of the axial boss, a prime mover, separable interengaging coupling members connecting the drive shaft with the prime mover, said coupling members being spaced from the outer end of the axial boss whereby separation of the coupling members moves the drive shaft and agitator shaft endwise toward the end of the casing through which the agitator is removable, and means in the axial boss forming a seal around the drive shaft.

ALLEN L. PAYTON.

REFERENCES CITED

The following references are of record in the file of this patent:

UNITED STATES PATENTS

| Number | Name | Date |
|---|---|---|
| 1,840,987 | Tranin | Jan. 12, 1932 |
| 1,997,032 | Alstad et al. | Apr. 9, 1935 |
| 2,018,618 | Schmidt | Oct. 22, 1935 |
| 2,201,552 | Ahlmann | May 21, 1940 |